(12) United States Patent
Zhang et al.

(10) Patent No.: US 10,160,439 B2
(45) Date of Patent: Dec. 25, 2018

(54) POWER EFFICIENCY CONTROL MECHANISM FOR A WORKING MACHINE

(71) Applicant: Parker-Hannifin Corporation, Cleveland, OH (US)

(72) Inventors: Hao Zhang, Twinsburg, OH (US); Raymond Collett, Put-in-Bay, OH (US); Zhesheng Jiang, Solon, OH (US); Blake Carl, University Heights, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 42 days.

(21) Appl. No.: 15/319,959

(22) PCT Filed: Jun. 18, 2015

(86) PCT No.: PCT/US2015/036400
§ 371 (c)(1),
(2) Date: Dec. 19, 2016

(87) PCT Pub. No.: WO2015/195895
PCT Pub. Date: Dec. 23, 2015

(65) Prior Publication Data
US 2017/0129473 A1    May 11, 2017

Related U.S. Application Data

(60) Provisional application No. 62/014,749, filed on Jun. 20, 2014.

(51) Int. Cl.
*B60W 20/11*    (2016.01)
*B60K 6/387*    (2007.10)
(Continued)

(52) U.S. Cl.
CPC ............. *B60W 20/11* (2016.01); *B60K 6/387* (2013.01); *B60K 6/48* (2013.01); *B60W 10/02* (2013.01);
(Continued)

(58) Field of Classification Search
CPC ...... B60W 20/00; B60W 10/08; B60W 10/06; Y02T 10/6286; B60K 6/445
(Continued)

(56) References Cited

U.S. PATENT DOCUMENTS 1,756,051 A    4/1930  Burke
4,638,779 A    1/1987  Kitada
(Continued)

FOREIGN PATENT DOCUMENTS

CH    706 518        11/2013
DE    10 2010 01367  10/2011
(Continued)

OTHER PUBLICATIONS

International Search Report and Written Opinion for corresponding International Patent Application No. PCT/US2015/036400 dated Oct. 1, 2015.
(Continued)

*Primary Examiner* — Maceeh Anwari
(74) *Attorney, Agent, or Firm* — Renner Otto Boisselle and Sklar

(57) ABSTRACT

A control system for a working machine that includes a power consumer (14) includes a prime mover (12), an energy storage unit (24) for storing energy, an auxiliary power unit (20) for generating power or consuming power, the auxiliary power unit (20) having a first connection (20a) coupled to the prime mover (12) and a second connection couplable to the energy storage unit (24). A controller (18) operatively coupled to the prime mover (12) and operatively
(Continued)

couplable to the power consumer (14) is configured to estimate a required power of the power consumer (14), and to command the prime mover (14) to operate at an optimal operating point that produces the estimated required power. Based on a relationship between power output capability of the prime mover and power consumption of the power consumer, the controller (18) is configured to at least one of command that excess power capacity from the prime mover be provided to the auxiliary power unit for storage in the energy storage unit, or command that energy stored in the energy storage unit be provided to the auxiliary power unit to drive the power consumer.

19 Claims, 4 Drawing Sheets

(51) Int. Cl.
| | |
|---|---|
| B60K 6/48 | (2007.10) |
| B60W 10/02 | (2006.01) |
| B60W 10/06 | (2006.01) |
| B60W 10/08 | (2006.01) |
| B60W 10/26 | (2006.01) |

(52) U.S. Cl.
CPC ............ *B60W 10/06* (2013.01); *B60W 10/08* (2013.01); *B60W 10/26* (2013.01); *B60W 2300/17* (2013.01); *Y10S 903/93* (2013.01); *Y10S 903/946* (2013.01)

(58) Field of Classification Search
USPC .......................................................... 701/22
See application file for complete search history.

(56) References Cited

U.S. PATENT DOCUMENTS

| | | |
|---|---|---|
| 4,643,146 A | 2/1987 | Spriessler |
| 4,838,755 A | 6/1989 | Johnson et al. |
| 7,255,088 B2 | 8/2007 | Nakamura et al. |
| 7,275,370 B2 | 10/2007 | Gesse et al. |
| 7,979,183 B2 | 7/2011 | Toda |
| 8,209,975 B2 | 7/2012 | Persson et al. |
| 8,751,114 B2 | 6/2014 | Filla |
| 2008/0006027 A1 | 1/2008 | Ozawa et al. |
| 2009/0125206 A1 | 5/2009 | Tisenchek et al. |

FOREIGN PATENT DOCUMENTS

| | | |
|---|---|---|
| EP | 2 584 181 | 4/2013 |
| GB | 2 469 864 | 11/2010 |
| WO | 2013/155451 | 10/2013 |

OTHER PUBLICATIONS

International Preliminary Report on Patentability for corresponding International Patent Application No. PCT/US2015/036400 dated Oct. 4, 2016.

POWER EFFICIENCY CONTROL MECHANISM FOR A WORKING MACHINE

This application is a national phase of International Application No. PCT/US2015/036400 filed Jun. 18, 2015 and published in the English language.

RELATED APPLICATION DATA

This application claims priority of U.S. Provisional Application No. 62/014,749 filed on Jun. 20, 2014, which is incorporated herein by reference in its entirety.

TECHNICAL FIELD

The present disclosure relates to a method and apparatus for controlling the power output of an engine for a working machine to enhance efficiency of the working machine.

BACKGROUND

A working machine, such as a construction machine or the like, typically has a number of different hydraulically powered functions that are controlled by a closed center hydraulic system. Such hydraulic systems typically feature more than one engine driven, variable displacement hydraulic pump, the displacement of which is responsive to the demands of the system.

On mobile applications an internal combustion engine (ICE) typically drives an electronically or mechanically controlled hydraulic pump, which is used to power hydraulic components. Generally, the engine speed is manually set by an operator or controller programmer and the torque is adjusted by the displacement of the pump according to the power demand of the hydraulic system. As the engine power output moves along a vertical line of constant speed the efficiency of the engine changes dramatically, as generally low torque areas of the engine equate to low efficiency and high torque areas equate to high efficiency.

Techniques are known for changing the power output of an engine according to the work load. According to such techniques, the working machine may include a "heavy work mode" in which it is possible to obtain a high (e.g., maximum) power output, and a "light work mode" in which it is possible to obtain power output up to a predetermined (low) level.

In operation, the driver manually selects between these modes via a changeover switch. In other words, if the operator determines that the work that will be performed henceforward is heavy work, then he selects the heavy work mode, while if he determines that it is light work, then he selects the light work mode.

Based on the selected mode, a controller for controlling the engine controls the power output capacity of the engine. For the light work mode the controller limits the power output of the engine to be less than or equal to a predetermined value (which is lower than the rated engine power output), for example, by limiting the amount of fuel supplied to the engine. In the heavy work mode, the controller does not impose a limitation on the fuel and therefore it is possible for the power output of the engine to reach the rated power.

As will be appreciated, often times the working machine does not continuously perform only heavy work or only light work, but rather alternates between heavy work and light work during a series of work processes. For example, an excavator, during typical excavation and loading, successively performs processes such as approaching a location (which is light work), excavating at the location and loading the excavated material into the bucket (which is heavy work), and dumping of the subject material for work upon a transportation vehicle such as a dump truck or the like (which is light work).

With such working processes, in order to enjoy the benefits of the prior art technique to the maximum level the driver must operate the changeover switch while changing over between heavy work and light work. However, it can be burdensome to perform such switch operation for each working process. As a result, it often happens that work is performed with the changeover switch maintained in the heavy work mode, thereby not taking advantage of the fuel savings afforded by the light work mode. On the other hand, if emphasis is placed upon fuel consumption and work is performed while in the light work mode, then it may not be possible to obtain sufficient power output during heavy work, and which can result in loss of efficiency.

SUMMARY OF THE INVENTION

In accordance with the present disclosure, a power requirement of the working machine is determined such that optimal prime mover speed and torque are used and hence energy efficiency is increased. In the event the power output by the prime mover exceeds the power demand by other systems, the excess power can be used to drive an auxiliary power device for converting the power into a form that can be stored in an energy storage device. Conversely, if the power output by the prime mover is less than the power demand by other systems, energy stored in the energy storage device can be used to drive the auxiliary device to augment the power provided by the prime mover.

In addition, motion profiles performed by the working machine can be stored in memory of a controller. The stored motion profiles then can be used to reproduce the desired motion in an energy-efficient manner. Also, system parameters can be monitored and compared to baseline parameters. Any deviation between the system parameters and the baseline parameters can signify eminent component failure.

According to one aspect of the invention, a control system for a working machine that includes a power consumer includes: a prime mover; an energy storage unit for storing energy; an auxiliary power unit for generating power or consuming power, the auxiliary power unit having a first connection coupled to the prime mover and a second connection couplable to the energy storage unit; and a controller operatively coupled to the prime mover and operatively couplable to the power consumer, the controller configured to: estimate a required power of the power consumer, command the prime mover to operate at an optimal operating point that produces the estimated required power, and based on a relationship between power output capability of the prime mover and power consumption of the power consumer, the controller is configured to at least one of command that excess power capacity from the prime mover be provided to the auxiliary power unit for storage in the energy storage unit, or command that energy stored in the energy storage unit be provided to the auxiliary power unit to drive the power consumer.

According to one aspect of the invention, the system includes a first clutch having a first clutch input and a first clutch output, the first clutch operable to selectively couple and decouple the first clutch input from the first clutch output, wherein the first clutch input is coupled to the prime mover and the first clutch output is coupled to the power consumer, and the controller is operatively coupled to the first clutch and configured to command the first clutch to decouple the prime mover from the power consumer when the estimated required power is less than a first prescribed value and energy stored in the energy storage unit is greater than a second prescribed value.

According to one aspect of the invention, the controller is further configured to disable the prime mover when the estimated required power is less than a first prescribed value and energy stored in the energy storage unit is greater than a second prescribed threshold.

According to one aspect of the invention, the controller is further configured to command the auxiliary power unit to operate in a motoring mode when the prime mover is in the disabled state and the energy stored in the energy storage unit is greater than the second prescribed value.

According to one aspect of the invention, the system includes a second clutch having a second clutch input and a second clutch output, the second clutch operable to selectively couple and decouple the second clutch input from the second clutch output, wherein the second clutch input is coupled to the auxiliary power unit and the second clutch output is coupled to the power consumer, and the controller is operatively coupled to the second clutch and configured to command the second clutch to decouple the auxiliary power unit from the power consumer when a difference between the power output by the prime mover and the power consumed by the power consumer is non-negative and less than a third prescribed value.

According to one aspect of the invention, estimating the required power of the power consumer includes measuring a load placed on the power consumer, and estimating the required power based on the measured load.

According to one aspect of the invention, the system includes the power consumer, wherein the power consumer is coupled to the prime mover and the auxiliary power unit.

According to one aspect of the invention, the prime mover comprises one of an internal combustion engine, a hydraulic motor, or an electric motor.

According to one aspect of the invention, the auxiliary power unit comprises a hydraulic pump operable in a first mode for generating hydraulic power and a second mode for consuming hydraulic power.

According to one aspect of the invention, the auxiliary power unit comprises at least one of a hydraulic machine or an electric machine.

According to one aspect of the invention, the energy storage unit comprises at least one of an accumulator for storing hydraulic energy or a battery for storing electric energy.

According to one aspect of the invention, the working machine comprises an excavator.

According to one aspect of the invention, the controller is configured to determine an optimal operating condition for the prime mover based on constant power lines characteristic of the prime mover.

According to one aspect of the invention, the controller is configured to determine an optimal operating condition by finding a lowest prime mover speed and a highest prime mover torque that produces the estimated required power for the power consumer.

According to one aspect of the invention, the controller is configured to store a motion profile, and automatically execute the stored motion profile.

According to one aspect of the invention, the controller is configured to compare system operating parameters to baseline parameters, and upon the system operating parameters deviating from the baseline parameters by a prescribed threshold, conclude component provide an indication of possible component failure.

According to one aspect of the invention, the system parameters comprise at least one of prime mover power output, prime mover speed, power consumer power input, hydraulic unit power, and hydraulic unit pressure.

According to one aspect of the invention, a controller for a working machine that includes a power consumer, a prime mover, an energy storage unit for storing power, and an auxiliary power unit for generating or consuming power includes: a processor and memory; logic stored in memory and executable by the processor, the logic including logic configured to estimate a required power of the power consumer, logic configured to command the prime mover to operate at an optimal operating point that produces the estimated required power, and logic configured to at least one of command that excess power producible by the prime mover be provided to the auxiliary power unit for storage in the energy storage unit, or command that energy stored in the energy storage unit be provided to the auxiliary power unit to drive the power consumer, wherein the command to provide excess power to the auxiliary power unit or provide energy stored in the energy storage unit to the auxiliary power unit is based on a relationship between power output capacity of the prime mover and power consumption of the power consumer.

According to one aspect of the invention, the controller further includes logic configured to disable the prime mover when the estimated required power is less than a first prescribed value and energy stored in the energy storage unit is greater than a second prescribed threshold.

According to one aspect of the invention, the controller further includes logic configured to command the auxiliary power unit to operate in a motoring mode when the prime mover is in the disabled state and the energy stored in the energy storage unit is above a second prescribed value.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Embodiments of this invention will now be described in further detail with reference to the accompanying drawings, in which.

DETAILED DESCRIPTION OF THE DRAWINGS

A system and method in accordance with the present disclosure enhances the efficiency of a working machine. More particularly, by actively controlling prime mover speed and torque through intelligent control of pump displacement, energy consumption can be improved. Prime mover speed and torque (via pump displacement) can each be adjusted according to an efficiency map to run on sweet spots (optimal operation regions) where the specific energy consumption has the lowest possible value. Further, automatic start/stop functionality can be implemented to further conserve energy. Such feature is particularly beneficial when the working machine is idling or very small power consumption is needed.

Figure 1:
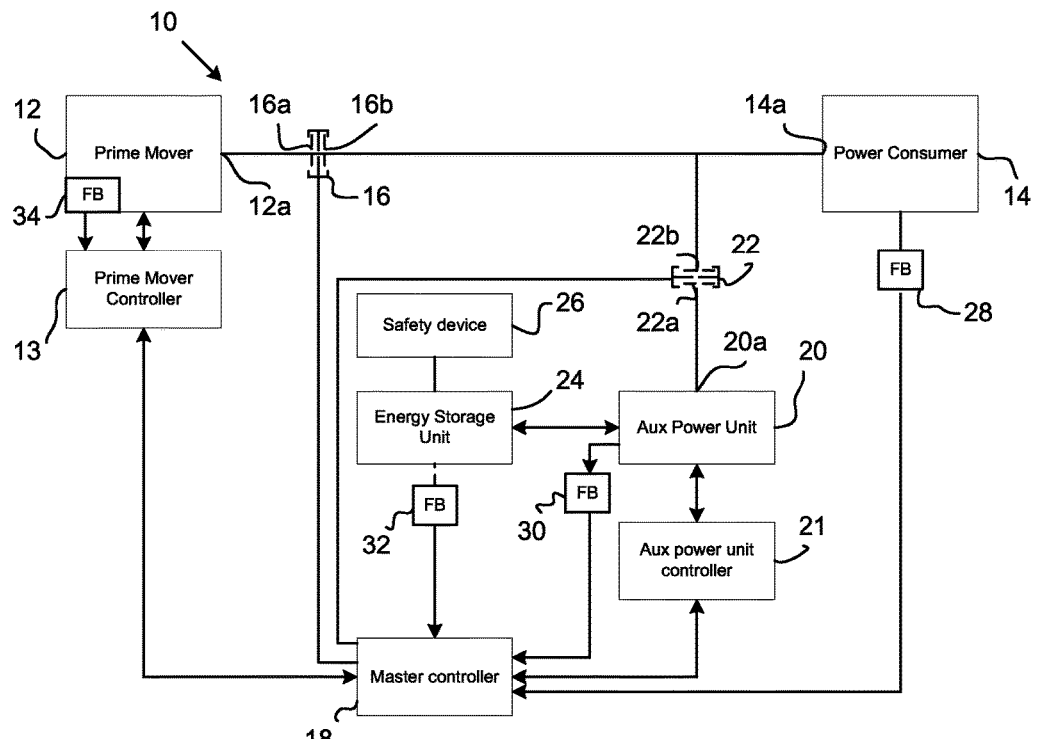
FIG. 1 is a block diagram illustrating an exemplary system for efficiently operating a working machine in accordance with the present disclosure.

Referring now to FIG. 1, illustrated is a block diagram of an exemplary control system 10 in accordance with the present disclosure that can be used with a working machine, such as an excavator or other heavy equipment. The system 10 includes a prime mover 12, such as an internal combustion engine, electric motor, hydraulic motor, or the like. The prime mover 12 includes a power take-off shaft 12a for providing power to drive various components of the system 10 as will be described in more detail below. A prime mover controller 13, such a computer controller, controls the speed and power output of the prime mover 12.

The prime mover controller 13 may take various forms depending on the type of prime mover 12 employed in the system 10. For example, if the prime mover 12 is embodied as an internal combustion engine (ICE), then the prime mover controller 13 may be an engine management computer. Similarly, if the prime mover 12 is embodied as an AC or DC motor, then the prime mover controller may be an AC or DC power module and associated computer controller. The prime mover controller 13 includes input/output channels for interfacing with the prime mover 12 and receiving data concerning the operational status of the prime mover 12. The prime mover controller 13 also may include a processing device and associated memory, as well as a communication interface for communicating with other controllers, such as a master controller.

A power consumer 14, such as a hydraulic system, electrical system or the like is coupled to the prime mover 12 via first clutch 16. Generally, the power consumer 14 may be any device that utilizes power such as, for example, a hydraulic system of a bucket loader. In this regard, the hydraulic system may include a variable displacement hydraulic pump in fluid communication with one or more hydraulic actuators. The prime mover 12 can provide power to the hydraulic pump, the power being converted to hydraulic power and provided to the hydraulic actuator(s) based on a user input command. Alternatively or additionally, the power consumer 14 may be an electrical power consumer, such as an electric generator or the like, which can be used to perform various operations, e.g., providing electrical power for use by the working machine, etc.

The first clutch 16 includes a first clutch input 16a and a first clutch output 16b, the first clutch input 16a being coupled to the prime mover power take-off shaft 12a and the first clutch output 16b being coupled to the power consumer power input shaft 14a. The first clutch 16 is operable to selectively couple/decouple the first clutch input from the first clutch output based on a command, for example, from controller 18.

A first power connection 20a of an auxiliary power unit 20 is mechanically coupled to the prime mover 12 and power consumer 14 via second clutch 22. The second clutch 22 includes a second clutch input 22a and a second clutch output 22b, the second clutch input being coupled to a power input 20a of the auxiliary power unit 20 and the second clutch output being coupled to the power consumer input 14a and the first clutch output 16b. Like the first clutch 16, the second clutch 22 is operable to selectively couple/decouple the second clutch input from the second clutch output based on a command from another device, such as controller 18.

An auxiliary power unit controller 21 is operatively coupled to the auxiliary power unit 20. The auxiliary power unit controller 21 is configured to regulate the flow of power into (regen mode) and out of (motoring mode) the auxiliary power unit 20. The form of the controller 21 is dependent on the type of auxiliary power unit 20 employed in the system 10. Regardless of the specific form of the auxiliary power unit 20, the auxiliary power unit controller 21 may include input/output devices for interfacing with the auxiliary power unit 20, a processing device and associated memory, and a communication interface for communicating with other devices, such as controller 18.

The auxiliary power unit 20 includes a second power connection 20b coupled to an energy storage unit 24. As will be described in more detail below, the auxiliary power unit 20 is operative to store excess power provided by the prime mover 12 and/or power consumer 14 in the energy storage unit 24, and to use energy stored in the energy storage unit 24 to power the prime mover 12 and/or power consumer 14. A safety device 26 monitors the condition of the energy storage unit 24 to prevent energy levels from exceeding predetermined limits.

The energy storage device 24 stores energy for later use when the power demand is low and provides energy when the power demand is high. This allows the prime mover 12 to be downsized, so long as the average prime mover power output is at least as high as the average power needed by the operation cycle of the power consumer 14.

In a preferred embodiment, the auxiliary power unit 20 is embodied as a hydraulic power unit having a hydro-machine operable as both a hydraulic pump that generates hydraulic power and a hydraulic motor that consumes hydraulic power, while the energy storage unit 24 is embodied as an accumulator and the safety device 26 is embodied as a pressure relief valve. The accumulator may be equipped with a compressible volume so that a pressure medium can be conveyed to the accumulator under compression of the compressible volume.

In another embodiment the auxiliary power unit 20 may be an electric power unit that includes an electric motor operable in both a generating mode and a motoring mode, while the energy storage unit 24 is embodied as one or more batteries for storing electrical energy and the safety device 26 is embodied as an overvoltage protection circuit.

To monitor and control the system 10, various feedback devices are utilized for the prime mover 12, power consumer 14, auxiliary power unit 20 and energy storage unit 24. More specifically, one or more power consumer feedback devices 28 may be operatively coupled to the power consumer 14 to monitor various system parameters. These feedback devices can include a load cell (or other load sensing device) coupled to the power consumer or a working portion of the machine that utilizes the power consumer, the load cell operative to provide a signal indicative of a load placed on the working machine (and thus on the power consumer). Other power consumer feedback devices may include a hydraulic pressure sensor for sensing hydraulic pressure on a hydraulic actuator and/or hydraulic line, current flowing from an electric machine, or any other sensor that provides an indication of load being consumed by the power consumer.

Similarly, one or more auxiliary power unit feedback devices 30 and 32 may be operatively coupled to the auxiliary power unit 20 and/or energy storage unit 24. For example, the feedback devices 30 and 32 may be embodied as a pressure sensor, a voltage sensor, a flow sensor, a current sensor, a speed sensor, a torque sensor or any other sensor for measuring a characteristic of the auxiliary power unit and energy storage unit. Such sensors can provide data indicative of the power provided to the energy storage unit 24, the energy stored in the energy storage unit 24, the power produced by the auxiliary power unit 20 and/or the power consumed by the auxiliary power unit 20, etc. Also, one or more prime mover feedback devices 34 may be operatively coupled to the prime mover 12. Such prime mover feedback devices may provide data indicative of a speed of the prime mover 12 (e.g., a speed sensor), output power of the prime mover 12 (e.g., a current sensor), and such data may be provided to the prime mover controller 13.

Data provided by the power consumer feedback devices 28, auxiliary power unit and energy storage unit feedback devices 30 and 32, and prime mover feedback devices 34 are provided to the controller 18 and used to control operation of the working machine as described below.

Figure 2:
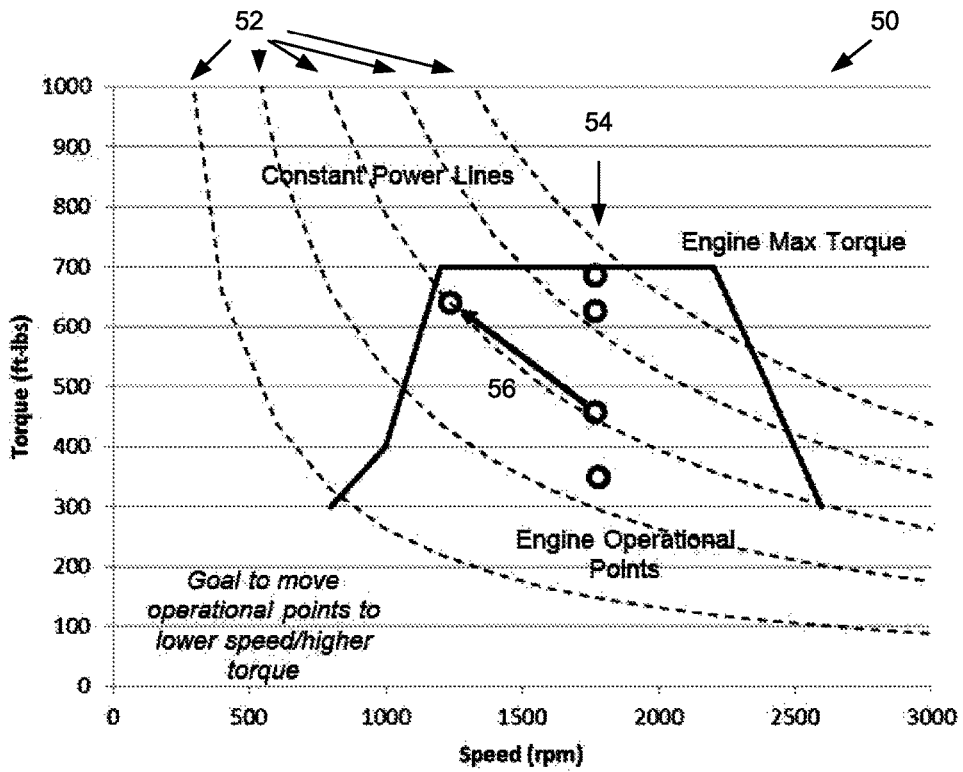
FIG. 2 is a graph showing speed vs. torque for an engine, with constant power lines for various engine speeds.

With additional reference to FIG. 2, illustrated is a torque vs. speed graph 50 showing constant power lines 52 for a prime mover embodied as an engine. More specifically, the x-axis of the graph corresponds to engine speed in RPM, while the y-axis of the graph corresponds to engine torque in ft-lbs. Constant power lines 52 illustrate the relationship between speed and torque while producing the same power output. In conventional working machines, the speed of the prime mover is generally fixed, while torque varies as needed based on the requirements of the power consumer 14. Such operation can be seen by the vertical arrangement 54 of engine operating points.

While such operation produces adequate power, it does not operate the prime mover 12 at optimal operation points. In accordance with an aspect of the present disclosure, both prime mover speed and torque (via a load placed on the prime mover) are shifted to produce a power output that meets the demands of the power consumer 14 while also providing energy-efficient operation of the prime mover 12. Such shift can be seen by the movement 56 of the prime mover operating point along a constant power line as shown in FIG. 2.

An engine, such as an internal combustion engine, can operate a various levels of efficiency and power output. Typically, high efficiency occurs when torque output is high and engine speed is low. To obtain high system efficiency, the engine speed and torque can be managed, for example by controller 18, to provide the required power for the power consumer 14 while operating in regions where energy consumption is lowest. In this regard, the controller 18 can estimate a required power of the power consumer 14, for example based on data provided by the power consumer feedback devices 28, and command the prime mover controller 13 to operate the prime mover 12 at a particular speed along one of the constant power lines 52. The controller 18 also can command the power consumer 14 to vary the load on the prime mover 12 (thus controlling the torque output of the prime mover 12) such that the torque moves about the constant power line 52. Such operation of the prime mover 12 produces power at an optimal operating point of the prime mover 12 and, thus, minimizes energy usage.

For example, in the case of a bucket loader the feedback device 28 may be a load sensing device (e.g., a load cell) that provides a signal indicative of the load placed on the power consumer 14. The controller 18 can analyze the data and estimate an amount of hydraulic power that will be needed to lift or lower the load. The estimated power along with knowledge of the variable displacement hydraulic pump(s) (e.g., displacement vs. swash plate angle) and associated components utilized in the power consumer 14 can be used to calculate the required pump displacement for various operational speeds of the prime mover 12. Using the constant power lines 52 as shown in FIG. 2, the controller 18 can select a speed for the prime mover 12 that produces the required torque while also operating in an efficient region (high torque, low speed), and communicate such operating point to the prime mover controller 13.

Preferably, the power output capability of the prime mover 12 is at least equal to the power consumption of the power consumer 14. In such situations, the auxiliary power unit 20 can be decoupled from the prime mover 12 to minimize energy consumption. For example, when a difference between the power output capability of the prime mover 12 and the power consumption of the power consumer 14 is non-negative and less than a prescribed value (i.e., the power output capability of the prime mover 12 is not less than the power consumption of the power consumer 14, also referred to herein as a third prescribed value), the controller 18 can command the second clutch 22 to disengage to decouple the auxiliary power unit 20 from the power consumer 14. In this manner, any drag associated with the auxiliary power unit 20 is removed from the system and thus energy efficiency improves.

While ideally the power output capability of the prime mover 12 will match or be slightly greater than the power consumption of the power consumer 14, in some instances the power output capability of the prime mover 12 may be greater than or less than the power consumption of the power consumer 14. In the event the power output capability of the prime mover 12 exceeds the power consumption of the power consumer 14, the excess power can be stored in the energy storage unit 24. For example, the controller 18 can command the clutch 22 to engage, thereby coupling the auxiliary power unit 20 to the prime mover 12 and power consumer 14, and command the auxiliary power unit controller 21 to place the auxiliary power unit 20 in generation mode (i.e., the auxiliary power unit 20 uses power provided by the prime mover 12 and/or power consumer 14 to generate power for storage in the energy storage unit 24). The excess power that can be produced by the prime mover 12 then can be used to drive the auxiliary power unit 20, which may be a hydraulic pump or an electric motor, and the power generated by the auxiliary power unit 20 can be stored in the energy storage unit 24, which may be an accumulator or a battery, for use at a later time.

Conversely, if the power output capability of the prime mover 12 is less than the power required by the power consumer 14, then energy stored in the energy storage unit 24 can be used to assist the prime mover 12. For example, the controller 18 can command the clutch 22 to engage, thereby coupling the auxiliary power unit 20 to both the prime mover 12 and power consumer 24, and command the auxiliary power unit controller 21 to place the auxiliary power unit 20 in motoring mode (i.e., the auxiliary power unit 20 consumes energy stored in the energy storage unit 24 to produce power for driving the prime mover 12 and/or power consumer 14). The energy stored in the energy storage unit 24 then can be used to drive the auxiliary power unit 20 (motoring mode), which may be a hydraulic pump or an electric motor. The power produced by the auxiliary power unit 20 then can be provided to the prime mover 12 and/or power consumer 14 to make up for any short-term power deficiencies of the prime mover 12.

Additionally, there may be instances in which the working machine is under a light load or even idling, and thus requires little power. In such situations, it may be advantageous to disable the prime mover 12 to minimize energy consumption. For example, when power usage is below a first value (referred to as a first prescribed value) and the energy stored in the energy storage unit 24 is above a second value (referred to as a second prescribed value), the controller 18 may command the first clutch 16 to disengage thereby decoupling the prime mover 12 from the power consumer 14. In addition, the controller 18 may instruct the prime mover controller 13 to turn off the prime mover 12. At the same or approximately same time, the controller 18 can command the second clutch 22 to engage thereby coupling the auxiliary power unit 20 to the power consumer 14, and instruct the auxiliary power unit controller 21 to operate the auxiliary power unit 20 in motoring mode, where energy stored in the energy storage device 24 is used to drive the auxiliary power unit 20. Power produced by the auxiliary power unit 20 then is provided to the power consumer 14 to enable operation of the working machine without the prime mover 12. In the event the energy stored in the energy storage unit 24 drops below a third value (referred to as a third prescribed value), the controller 18 can command the first clutch 16 to engage thereby coupling the prime mover 12 to the second clutch 22 and the auxiliary power unit 20 can be used to start the prime mover 12. In this manner, the system can seamlessly enable and disable the prime mover 12 on an as-needed basis so as to minimize energy consumption.

Further, the control system in accordance with the present disclosure may include an automatic position mode and a system monitor mode. The automatic position mode enables a repetitive motion (e.g., a motion profile) of the working machine to be stored by the controller 18, the profile being automatically executed in an energy-efficient manner. For example, when starting or ending a swing motion for an implement of an excavator, a sensor can record the starting or ending angle of the implement. As the swing approaches this angle, displacement of a swing motor that drives the swing motion can be reduced (e.g., via swash plate angle) to maintain a small torque/velocity (and therefore predict when the implement will be stopped) until the desired position is achieved. Such small torque/velocity can be based on known inertias and losses for the components associated with the swing motion. In other words, the controller 18, by taking into consideration the desired position and known system losses and inertias, can intelligently command the prime mover 12, auxiliary power unit 20 and power consumer 14 to use the minimal amount of energy that can produce the required motion. Such operation not only provides improved smoothness in operation for the working machine, but also minimizes operator error and can relieve the fatigue.

Regarding the system monitor mode, this mode enables the controller 18 to determine if system components are in a degraded state and/or in eminent failure. In this regard, the controller 18 can monitor system operating parameters via sensor data for various systems of the working machine, including the prime mover 12, auxiliary power unit 20, energy storage unit 24 and power consumer 14. Exemplary operating parameters include, but are not limited to, prime mover power output, prime mover speed, power consumer power input, hydraulic unit power, hydraulic unit pressure, and hydraulic pump displacement. The collected operating parameters then are compared to baseline data, which may be obtained during a calibration mode and stored in memory of the controller 18. If deviations between the collected operating parameters and the baseline data exceed corresponding prescribed values, the controller 18 can provide a signal indicating system degradation and/or limit operation speeds and/or power output of the working machine.

Figure 3:
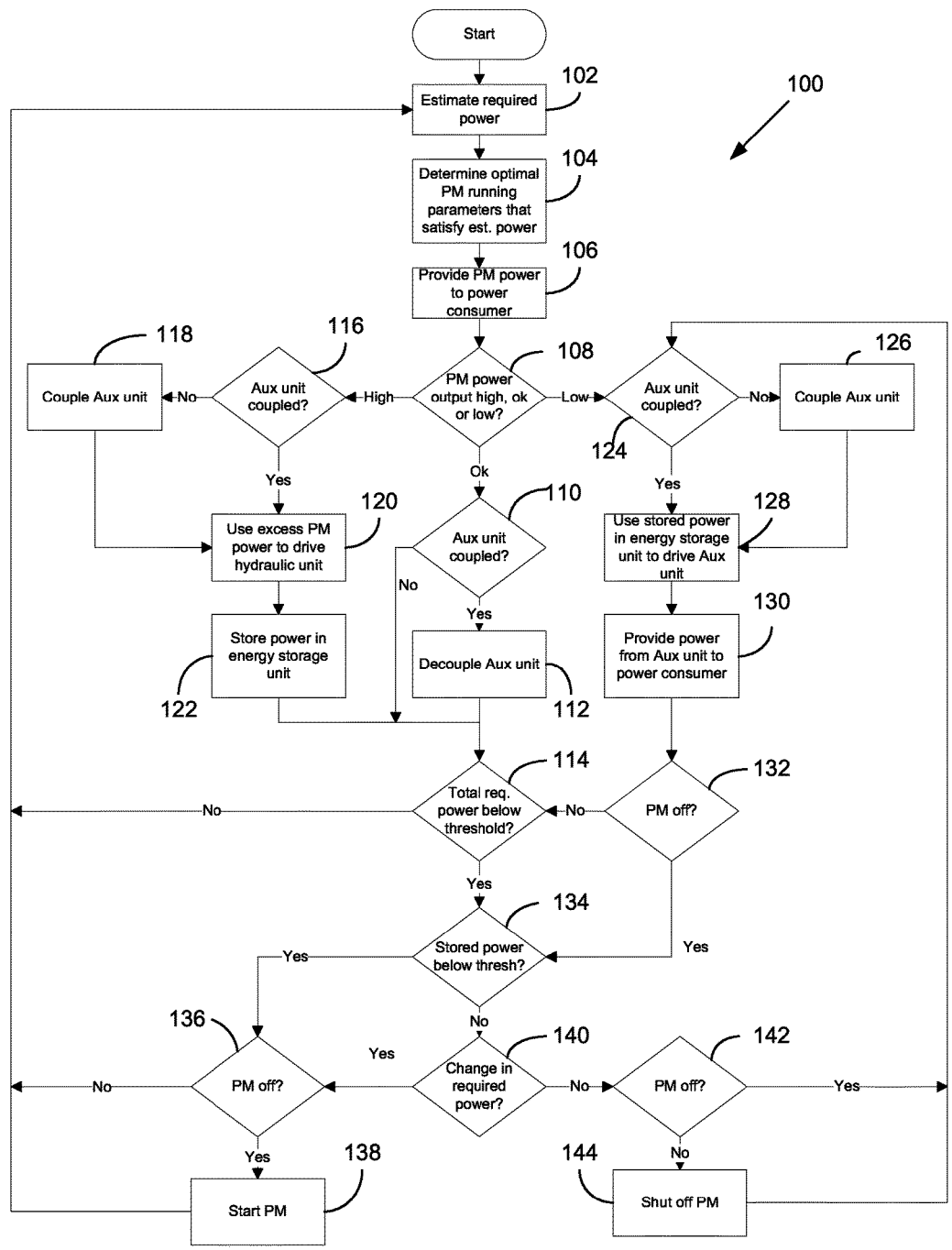
FIG. 3 is a flow chart illustrating exemplary steps for efficiently operating a working machine in accordance with the present disclosure.
Figure 4:
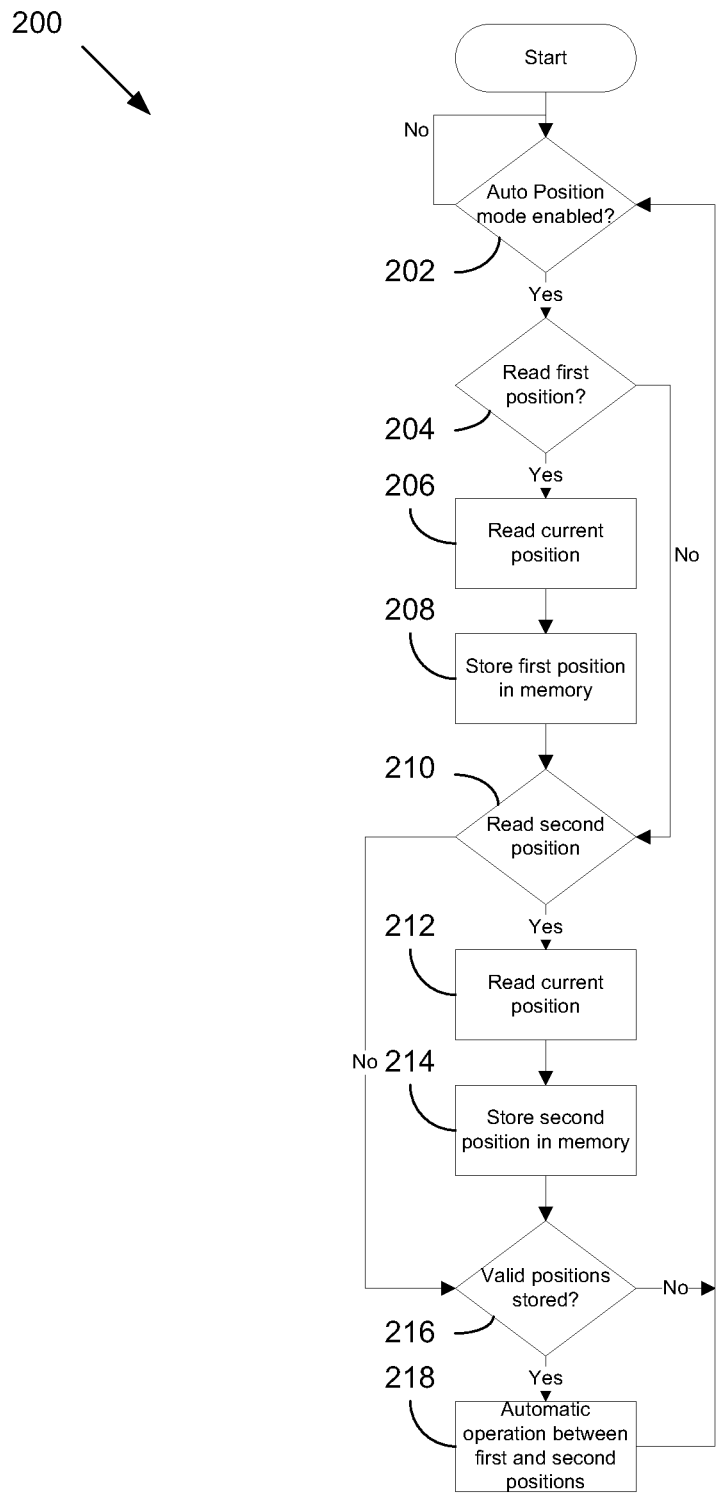
FIG. 4 is a flow chart illustrating exemplary steps for defining a prescribed motion and automatically carrying out the motion in accordance with the present disclosure.
Figure 5:
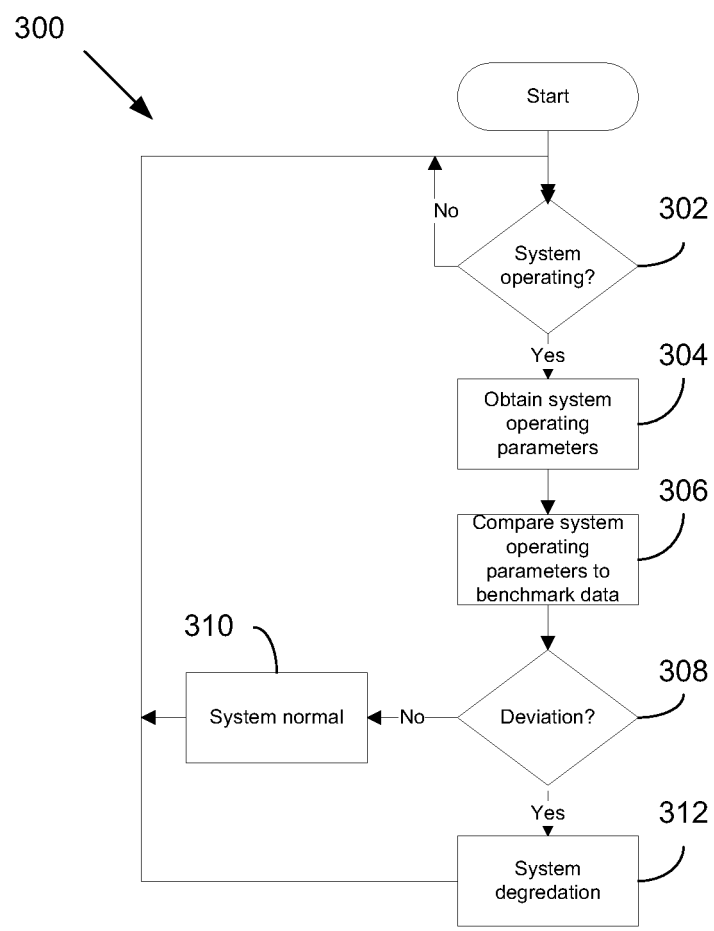
FIG. 5 is a flow chart illustrating exemplary steps for determining system degradation and/or failure in accordance with the present disclosure.

Referring now to FIGS. 3-5, several flow diagrams illustrating exemplary methods for controlling a working machine in accordance with embodiments of the present disclosure are provided. The flow diagrams include a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

FIG. 3 illustrates a flow diagram 100 for controlling power flow in a working machine in accordance with the present disclosure. Beginning at block 102, the controller 18 estimates the power required by the power consumer 14. As described herein, such estimate may be based on feedback data indicative of a load subjected to the power consumer. At block 104, the controller 18 determines optimal operational characteristics for the prime mover 12 and power consumer 14 (e.g., pump displacement) that will deliver the estimated power to the power consumer 14. In determining the optimal operational characteristics, the controller 18 utilizes constant power lines for the prime mover 12. More particularly, the required power of the power consumer 14 can be compared to a speed and torque output of the prime mover 12 along the constant power lines 52 of FIG. 2 to determine which constant power line 52 provides a most energy-efficient operating point for the prime mover 12 (typically the lowest speed and highest torque produces the most energy efficient operation). Next at block 106 the controller 18 commands the prime mover controller 13 to drive the prime mover 12 at a speed along the selected constant power line 52 that can produce the required torque, and commands the power consumer 14 to set a load on the prime mover (e.g., set pump displacement), which results in the prime mover outputting the required torque at the set speed. Such command may be communicated, for example, via a network or other communication connection between the controller 18 and the prime mover controller 13.

At block 108, the controller 18 determines if the power capability of the prime mover 12 is approximately equal to, greater than or less than the power required by the power consumer 14. If the controller 18 determines that the power capability of the prime mover 12 is substantially equal to the power required by the power consumer 14 (e.g., a difference between the power capability of the prime mover 12 and the power required by the power consumer 14 is non-negative and within a prescribed value (referred to as a fourth prescribed value)), then the method moves to block 110 where the controller 18 determines if the second clutch 22 is engaged or disengaged. If the second clutch 22 is engaged, then at block 112 the controller 18 commands the second clutch 22 to disengage so as to decouple the auxiliary power unit 20 from the power consumer 14. By decoupling the auxiliary power unit 20, any losses associated with driving the auxiliary power unit 20 can be eliminated and thus energy consumption can be minimized. The method then can proceed to block 114. If, however, the second clutch 22 is already disengaged, then the method can move directly to block 114.

Moving back to block 108, if the controller 18 determines the power capability of the prime mover 12 is substantially greater than the power required by the power consumer 14, then the method moves to block 116 where the controller 18 determines if the second clutch 22 is engaged or disengaged. If the second clutch 22 is disengaged, then the method moves to block 118 where the controller 18 commands the second clutch 22 to engage, thereby coupling the auxiliary power unit 20 to the power consumer 14, and then the method moves to block 120. Moving back to block 116, if the second clutch 22 is already engaged the method moves directly to block 120, where the controller 18 commands the auxiliary power controller 21 to operate the auxiliary power unit 20 in motoring mode, and at block 122 the excess power generated by the auxiliary power unit 20 (e.g., excess power in the form of electrical or hydraulic power) is stored in the energy storage unit 24. From block 122 the method can proceed to block 114.

Moving again back to block 108, if the controller 18 determines the power capability of the prime mover 12 is less than the power required by the power consumer 14, then the method moves to block 124 where the controller 18 determines if the second clutch 22 is engaged or disengaged. If the second clutch 22 is disengaged, then the method moves to block 126 where the controller 18 commands the second clutch 22 to engage, thereby coupling the auxiliary power unit 20 to the power consumer 14 and then the method moves to block 128. Moving back to block 124, if the second clutch 22 is already engaged, the method moves directly to block 128 where controller 18 commands the auxiliary power unit controller 21 to operate the auxiliary power unit 20 in motoring mode. Energy stored in the energy storage unit 24 (e.g., electrical or hydraulic power) then is used to drive the auxiliary power unit 20. At block 130 the power generated by the auxiliary power unit 20 is then provided to the power consumer 14.

From block 130 the method moves the block 132 where the controller determines if the prime mover 12 is enabled or disabled (on or off). If the prime mover 12 is enabled/on, the method moves to block 114 where the controller 18 determines if the power required by the power consumer 14 is below a prescribed value (referred to as a first prescribed value). If the power required by the power consumer 14 is not below the first prescribed value, then the method moves back to block 102 and repeats. However, if the power required by the power consumer is less than the first prescribed value, then the method moves to block 134 where controller 18 determines the amount of energy stored in the energy storage device 24, for example, using the feedback device 32. If the amount of energy stored in the energy storage unit 24 is below a prescribed value (referred to as a second prescribed value), then this indicates there is insufficient energy stored in the energy storage unit 24 to power the power consumer 14 without assistance of the prime mover 12. Therefore, the method moves to block 136 where the controller 18 determines if the prime mover 12 is enabled or disabled (on or off). If the prime mover 12 is enabled, the method moves back to block 102 and repeats. However, if the prime mover 12 is disabled, then the method moves to block 138 where the prime mover 12 is enabled (started). In this regard, the energy stored in the energy storage unit 24 can be used to drive the auxiliary power unit 20, which in turn can drive the prime mover 12 so as to start the prime mover (assuming the prime mover is embodied as an engine). To implement such function, the controller 18 can command the auxiliary power unit controller 21 to operate the auxiliary power unit 20 in motoring mode, command the first and second clutches 16 and 22 to be engaged (if not already engaged) and command the prime mover controller 13 to enable the prime mover 12. Once the prime mover 12 is enabled, the method moves back to block 102 and repeats.

Moving back to block 134, if the amount of energy stored in the energy storage unit 24 is greater than the second prescribed value, then this indicates the auxiliary power unit 20 can be used to drive the power consumer 14 and the prime mover 12 can be disabled so as to conserve energy. Therefore, the method moves to block 140 where the controller 18 determines if there has been a change in the power required by the power consumer 14. If there has been a change in the power required by the power consumer 14, then the working machine may no longer be in an idle or low-power state and the method moves to block 136 and executes the steps as described above. However, if there is no change in the power required by the power consumer 14 (i.e., the working machine is in an idle or low power state), then the method moves to block 142 where the controller 18 determines if the prime mover 12 is disabled/off. If the prime mover 12 is disabled/off, then the method moves to block 124 and executes the steps as described above. If, however, the prime mover 12 is enabled/on, then the method moves to block 144 where the controller 18 commands the prime mover controller 13 to disable the prime mover 12, and the method moves back to block 124.

Moving now to FIG. 4, illustrated is a flow diagram 200 for automatically operating a working machine in accordance with the present disclosure. Beginning at block 202, the controller 18 determines if the working machine is in auto position mode. Such determination can be based, for example, on a selector switch position or other operator input device as is conventional. If auto position mode is not enabled, then the method loops at block 202. However, if auto position mode is enabled, then at block 204 the controller 18 determines if a first position is to be read and stored in memory, e.g., an initial position of the working machine, such as a start position of a swing motion. Such determination can be based on a pushbutton entry or other means for signaling that the current position should be stored as the initial position.

If the first position is not to be read, then the method moves to block 210, which is described below. If the first position is to be read, then at block 206 the controller 18 determines the current position of the function of interest (e.g., a swing motion). The current position may be based on data obtained by feedback devices 28 of the power consumer 14 (e.g., an actuator position). Next at block 208 the controller 18 stores the current position in memory as an initial position for use during automatic operation, and the method proceeds to clock 210.

At block 210 the controller determines if a second position is to be read. The second position, for example, may be a final position of the working machine, e.g., an end position of a swing motion. Again, such determination can be based on a pushbutton entry or other means for signaling that the current position should be stored as the second position. If the second position is not to be read, then the method moves to block 216, which is described below. If the second position is to be read, then at block 212 the controller 18 determines the current position of the function of interest (e.g., a swing motion). Again, the current position may be based on data obtained by feedback devices 28 of the power consumer 14 (e.g., an actuator position). Next at block 214 the controller 18 stores the current position in memory as a second position for use during automatic operation, and the method proceeds to clock 216.

At block 216, the controller determines if valid first and second positions have been read and stored in memory. If both positions have not been read and stored, the method moves back to block 202 and repeats. However, if valid positions have been read, then the controller 18 can generate a motion profile for the particular function of interest, and automatically command the prime mover controller 13 to operate at a point on the constant power curve that provides the power needed by the power consumer 14, command the power consumer 14 to execute the motion profile, and command the auxiliary power unit controller 21 to store excess power from the prime mover 12 and/or power consumer 14, provide stored power to the power consumer 14 and/or prime mover 12, and/or command the first and second clutches 16 and 22 to couple or decouple the prime mover 12 and/or auxiliary power unit 20 from the power consumer 14 based on specific system conditions as determined from the feedback devices 28, 30, 32 and 34.

The method of FIG. 4 provides improved smoothness in operation for a working machine. For example, as a swing motion returns back to the initial position the displacement of a motor associated with the swing motion can be reduced to maintain a small torque/velocity, therefore predicting when the implement will be stopped. This is an automatic position and end stroke/rotation damping and an automatic calibration feature which will help the operator reduce error and relieve the fatigue. Further, based on the recorded start and end points for the desired motion along with the constant power lines 52 and known characteristics of the working machine, e.g., inertias, losses, etc., the controller 18 can calculate a motion profile that is most efficient from an energy consumption standpoint, thus minimizing operating costs.

Moving now to FIG. 5, illustrated is a flow diagram 300 for automatically detecting system degradation and/or eminent system failure in accordance with the present disclosure. Beginning at block 302, the controller 18 determines if the working machine is in an operational state. In this regard, the controller 18 can determine the operation state based on data provided by the feedback devices 28, 30, 32 and 34, and/or based on operator input such as joystick inputs, selector switch positions, etc. If the working machine is not in an operating state, the method loops at block 302. If the working machine is in an operating state, the controller 18 collects various data from the working machine via the feedback devices 28, 30, 32 and 34 and stores the data in memory. The collected data can include, but is no limited to, prime mover power output, prime mover speed, prime mover torque output, prime mover fuel consumption, prime mover mass-air flow, prime mover current, prime mover voltage, power consumer power input, power consumer hydraulic pressure(s), power consumer speeds (e.g., actuator speeds), power consumer displacements (e.g., pump displacements), auxiliary unit hydraulic pressures or currents for motoring and regen modes, energy storage unit hydraulic pressure, voltage, etc.

At block 306 the one or more system operating parameters are compared to corresponding baseline parameters. The baseline parameters may be obtained during a calibration mode of the working machine and stored in memory of the controller 18. If at block 308 there is a deviation between the operating parameters and the baseline parameters by more than a prescribed value, such as for example a 10 percent or more deviation, then at block 312 the controller 18 can flag the operator that system degradation has occurred and/or system failure is eminent. Further, the controller can limit operation speeds of various components to minimize further damage and/or enable operation at a reduced rate. If at block 308 the system operating parameters and the baseline parameters are within the prescribed value of each other, then the controller 18 can conclude the system is operating normal and the method moves back to block 302 and repeats.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A control system for a working machine that includes a power consumer, comprising:
    a prime mover;
    an energy storage unit configured to store energy;
    an auxiliary power unit configured to store power or consume power, the auxiliary power unit having a first connection coupled to the prime mover and a second connection couplable to the energy storage unit; and
    a controller operatively coupled to the prime mover and operatively couplable to the power consumer, the controller configured to:
        estimate, based on data from at least one sensor, a required power of the power consumer,
        compare the estimated required power to speed and torque output of the prime mover along constant power lines of the prime mover;
        determine, based on the comparison, which constant power line can produce the estimated required power at a most energy-efficient operating point for the prime mover;
        command the prime mover to operate along the constant power line that can produce the estimated required power at the most energy-efficient operating point, and
        based on a relationship between power output capability of the prime mover and power consumption of the power consumer, the controller is configured to at least one of i) command that excess power capacity from the prime mover be provided to the auxiliary power unit for storage in the energy storage unit, or ii) command that energy stored in the energy storage unit be provided to the auxiliary power unit to drive the power consumer.

2. The system according to claim 1, further comprising a first clutch having a first clutch input and a first clutch output, the first clutch operable to selectively couple and decouple the first clutch input from the first clutch output, wherein the first clutch input is coupled to the prime mover and the first clutch output is coupled to the power consumer, and the controller is operatively coupled to the first clutch and configured to command the first clutch to decouple the prime mover from the power consumer when the estimated required power is less than a first prescribed value and energy stored in the energy storage unit is greater than a second prescribed value.

3. The system according to claim 1, wherein the controller is further configured to disable the prime mover when the estimated required power is less than a first prescribed value and energy stored in the energy storage unit is greater than a second prescribed threshold.

4. The system according to claim 3, wherein the controller is further configured to command the auxiliary power unit to operate in a motoring mode when the prime mover is in the disabled state and the energy stored in the energy storage unit is greater than the second prescribed value.

5. The system according to claim 1, further comprising a second clutch having a second clutch input and a second clutch output, the second clutch operable to selectively couple and decouple the second clutch input from the second clutch output, wherein the second clutch input is coupled to the auxiliary power unit and the second clutch output is coupled to the power consumer, and the controller is operatively coupled to the second clutch and configured to command the second clutch to decouple the auxiliary power unit from the power consumer when a difference between the power output by the prime mover and the power consumed by the power consumer is non-negative and less than a third prescribed value.

6. The system according to claim 1, wherein estimating the required power of the power consumer includes measuring a load placed on the power consumer, and estimating the required power based on the measured load.

7. The system according to claim 1, further comprising the power consumer, wherein the power consumer is coupled to the prime mover and the auxiliary power unit.

8. The system according to claim 1, wherein the prime mover comprises one of an internal combustion engine, a hydraulic motor, or an electric motor.

9. The system according to claim 1, wherein the auxiliary power unit comprises a hydraulic pump operable in a first mode for generating hydraulic power and a second mode for consuming hydraulic power.

10. The system according to claim 1, wherein the auxiliary power unit comprises at least one of a hydraulic machine or an electric machine.

11. The system according to claim 1, wherein the energy storage unit comprises at least one of an accumulator for storing hydraulic energy or a battery for storing electric energy.

12. The system according to claim 1, wherein the working machine comprises an excavator.

13. The system according to claim 1, wherein the controller is configured to determine an optimal operating condition by finding a lowest prime mover speed and a highest prime mover torque that produces the estimated required power for the power consumer.

14. The system according to claim 1, wherein the controller is configured to store a motion profile, and automatically execute the stored motion profile.

15. The system according to claim 1, wherein the controller is configured to compare system operating parameters to baseline parameters, and upon the system operating parameters deviating from the baseline parameters by a prescribed threshold, conclude component provide an indication of possible component failure.

16. The system according to claim 15, wherein the system parameters comprise at least one of prime mover power output, prime mover speed, power consumer power input, hydraulic unit power, and hydraulic unit pressure.

17. A controller for a working machine that includes a power consumer, a prime mover, an energy storage unit configured to store power, and an auxiliary power unit configured to generate or consume power, the controller comprising:

a processor and memory;

logic stored in memory and executable by the processor, the logic including logic configured to estimate, based on data from at least one sensor, a required power of the power consumer, logic configured to compare the estimated required power to speed and torque output of the prime mover along constant power lines of the prime mover;

logic configured to determine, based on the comparison, which constant power line can produce the estimated required power at a most energy-efficient operating point for the prime mover;

logic configured to command the prime mover to operate along the constant power line that can produce the estimated required power at the most energy-efficient operating point, and logic configured to at least one of i) command that excess power producible by the prime mover be provided to the auxiliary power unit for storage in the energy storage unit, or ii) command that energy stored in the energy storage unit be provided to the auxiliary power unit to drive the power consumer, wherein the command to provide excess power to the auxiliary power unit or provide energy stored in the energy storage unit to the auxiliary power unit is based on a relationship between power output capacity of the prime mover and power consumption of the power consumer.

18. The controller according to claim 17, wherein the controller further includes logic configured to disable the prime mover when the estimated required power is less than a first prescribed value and energy stored in the energy storage unit is greater than a second prescribed threshold.

19. The controller according to claim 17, wherein the controller further includes logic configured to command the auxiliary power unit to operate in a motoring mode when the prime mover is in the disabled state and the energy stored in the energy storage unit is above a second prescribed value.

* * * * *